United States Patent [19]

Howitt

[11] 4,371,259
[45] Feb. 1, 1983

[54] DIGITAL COLOR PRINTER SYSTEM

[75] Inventor: George L. Howitt, River Edge, N.J.

[73] Assignee: Charles Beseler Company, Florham Park, N.J.

[21] Appl. No.: 116,275

[22] Filed: Jan. 28, 1980

[51] Int. Cl.³ .......................................... G03B 27/73
[52] U.S. Cl. .................................................. 355/38
[58] Field of Search ................................. 355/35–38, 355/68, 77, 88; 356/443, 444, 404

[56] References Cited

U.S. PATENT DOCUMENTS

| | | | |
|---|---|---|---|
| 3,672,768 | 6/1972 | Schaub et al. | 355/38 |
| 3,724,946 | 4/1973 | Knapp et al. | 355/38 X |
| 3,947,110 | 3/1976 | Yamada | 355/88 X |
| 4,068,943 | 1/1978 | Gyori | 355/38 |
| 4,174,173 | 11/1979 | Pone, Jr. | 355/38 |
| 4,175,853 | 11/1979 | Harvey | 355/38 |
| 4,294,537 | 10/1981 | Laska et al. | 355/35 |

Primary Examiner—G. Z. Rubinson
Assistant Examiner—W. J. Brady
Attorney, Agent, or Firm—Darby & Darby

[57] ABSTRACT

A digital color printer system measures and provides a digital display for the primary color values of incident light from a colorhead for the system. The color mixture of light from the colorhead can be programmed in accordance with selected color values for the accurate reproduction of a print from a negative. The color printer system includes a microprocessor for carrying out various program functions for calculating, utilizing, and storing color value and exposure data, and a combined accessory unit including a keyboard, a input/output device, and a color analyzer probe interfaced with the microprocessor.

13 Claims, 6 Drawing Figures

DIGITAL COLOR PRINTER SYSTEM

BACKGROUND OF THE INVENTION

This invention relates generally to a photographic color printer system and more particularly to such a system capable of deriving, utilizing, and storing digital color value and print exposure data for the accurate reproduction of prints.

Conventional color printer systems have been known to combine an additive-type color printer with a microprocessor or digital system for controlling the source intensity for each primary color of incident light in the printer. For example, in one form of an additive printer, light from a lamp source for each primary color is added together to produce incident light illuminating a frame of film to be printed. As an example, the Gyori U.S. Pat. No. 4,068,943 shows an additive colorhead having color sensors in the mixing chamber for providing analog signals to be compared in a feedback loop with signals derived from digital values keyed in through a keyboard. The feedback loop controls the power applied to each color source lamp until the measured intensity for each color corresponds to the keyed-in digital color value. However, this system provides a digital display of only the keyed-in values, and cannot be used to directly measure and quantify the color values in a desired color mixture of incident light nor to program the functions of the printer in accordance with such measured or other derived values.

Another form of color printer, such as described in the Meyer et al U.S. Pat. No. 4,150,894 or Amano et al. U.S. Pat. No. 3,888,580, automatically processes a series of original frames by measuring the color density of each frame and computing the desired exposure parameters for each frame. The exposure information is stored in memory and used during the printing of each corresponding frame. Conventional color printers also employ the subtractive mode of adjusting the color mixture in the incident light of the printer. As shown in the Barbieri U.S. Pat. No. 4,165,175, for example, such systems typically employ the mechanical positioning of blocking filters in the path of a source beam of white light in order to selectively subtract from the intensity of a particular primary color. The mechanical positioning of the filters is accomplished usually with a gear or threaded screw drive. The current state of the art in subtractive colorheads is to display the color values in terms of the amount of filtration indicated on dial indicators or counters that are mechanically coupled to the filter drives. The color content of the incident light is thus subject to wide variations due to mechanical tolerances, the voltage to or condition of the source lamp, and differences between printer units.

In summary, none of the known color printers have the capacity to provide standardized, calibrated quantifications and a digital display of actual measurements of the color values of the incident or source light, or to program the functions of the printer in accordance with such measured or other derived color values. This deficiency precludes the accurate programming of a color printer in accordance with standardized values or, particularly in a subtractive-type printer, the reproduction of an exact color mixture of incident light in the same or another printer.

SUMMARY OF THE INVENTION

In order to remedy the deficiencies of known color printers of both the subtractive and additive types, it is a principal purpose of the present invention to provide a color printer system which directly measures the intensity of each primary color constituting the incident light in the printer and converts and displays that measurement in terms of digital color values. It is a further purpose of the invention to provide a color printer system which is calibrated with respect to a standardized light source, and wherein the color mixture of incident light in the same or another printer can be accurately adjusted, adapted, or programmed in accordance with the calibrated digital color values.

Another object of the invention is to provide a color printer system having a microprocessor for computing relative color values between primary colors such that a particular mixture of primary color in the incident light can be reproduced in the same or another printer without regard to variations in the intensity of the source light, for example, such as may be due to variations in line voltage, source lamp intensity, or differences in printer units.

It is also an object of the invention to provide for adjustment of the relative color values in accordance with the particular emulsion characteristics of the photographic paper being used, and for quantifying and compensating for "cross-talk" in the color composition of each primary color of the incident light.

It is still a further purpose of the invention to provide an integrated color printer system having a digitally controlled colorhead, a microprocessor and memory, and means for introducing and/or displaying color value data, exposure data, and system commands. It is also an object of the invention to provide a color analyzer accessory, read/write device, and keyboard interfaced with the color printer system.

In accordance with the purposes of this invention, a color printer system comprises a light source, means for controlling a color mixture of light from the source variably with respect to a set of primary colors, means for directing the light as incident light through an original photographic film for exposure onto a developable photographic sheet or material, photosensors associated with the light directing means for providing signals indicative of the light intensity of the primary colors in the incident light, a microprocessor and associated circuitry for converting the intensity signals into digital color values, and a digital display for displaying numerically the color values for the primary colors of the incident light.

The digital color printer system is adaptable to either of the additive or subtractive-type color printer systems. In an additive color printer, for example, the incident light intensity for each of three primary colors, blue, red, and green, is adjusted by increasing or decreasing the power to a source lamp filtered for the corresponding primary color. In a subtractive system, filters corresponding to the primary colors, cyan, magenta, and yellow, are variably interposed in the path of a beam of source light in order to obtain a desired color mixture in the incident light to the photographic film.

In a "density" mode of the inventive system, the digital color values for the primary colors of incident light are displayed numerically to provide the user with an exact, quantized indication of the light intensity of each primary color. The system includes means for calibrating the digital colorhead against a standardized light source which is provided with the system. The digital color values displayed are directly related to the measured primary color intensity levels, and can be used to reproduce or program the same color combination in the same or another colorhead unit.

In a "filtration" mode of the digital color printer system, the microprocessor is used to compute the relative difference between the three primary color value measurements. In this mode the lowest numerical value is used as a reference zero and subtracted from the other two higher numerical values. The resultant filtration values represent the differences between primary color levels relative to a common base or neutral density. These filtration values represent a quantification of the relative primary color mixture irrespective of the overall intensity of the incident light. Thus, a desired color mixture can be exactly reproduced or programmed on the same or another colorhead system without regard to the differences in filters or in source light intensity which may vary from system to system depending upon line voltage, lamp condition, etc. An advantage of the system in both modes is the ability to measure and adjust for the cross-talk between contributions to the other primary colors present in one primary color.

An integrated, digital color printer system according to the invention also includes a color analyzer probe interfaced with the microprocessor for measuring the intensity of light projected through the photographic film, for deriving color value and exposure data relating thereto, and for programming the system with respect to such information. In addition, an input/output device interfaced with the microprocessor is used to read or write color value or exposure data from or onto a storage medium associated with a particular film or print.

The integrated, digital color printer system further includes a keyboard for inputting numerical data and selecting program functions for the system. Such functions include, but are not limited to, entering desired color value or exposure data, recalling stored data, reading or writing system data from or onto a storage medium, and deriving and utilizing color value, paper characteristic, exposure, and other data for the accurate reproduction of prints. The system microprocessor has a read-only memory for storing programmed subroutines for the functions of the color printer system. These functions are described in further detail below.

The keyboard is preferably combined with the color analyzer probe and input/output device into a single accessory unit. The system also includes a number of desirable operational features. An interlock system signals a test condition and prevents exposure if the filters for the light source are in a white light test mode. Means are provided for calibrating the color value response of the system against a standardized lamp source. This system also provides for interchangeable mixing chambers, and means for identifying the mixing chamber installed and for adjusting the various mixing chambers to provide the same amount of light to the photosensors.

DESCRIPTION OF THE DRAWINGS

The above features and the further advantages of the invention are described in detail below in conjunction with the following drawings, of which.

DETAILED DESCRIPTION OF THE INVENTION

The invention can be used in color printer systems of either the additive or subtractive type. In order to produce photographic prints from either a color negative or positive, a controllable color light mixer or "colorhead" is required in the color printer system. In one form of an additive system, the color light mixture is provided by a set of source lamps filtered for the desired set of primary colors, blue, red and green. The color mixture of the light is controlled by increasing or reducing the power to each source lamp in accordance with the desired color levels. In other forms of additive systems, a single light source may be used with a set of filters to sequentially expose for each primary color according to intensity level or time of exposure.

Typically for subtractive colorheads, three filters corresponding to the desired set of primary colors, cyan, yellow, and magenta, are interposed for varying degrees of color subtraction from a beam of light from a white light source. The amount of insertion of each filter across the light beam produces a corresponding change in the intensity of the primary color light passed by that filter. Thus, for example, when the magenta filter intercepts approximately half of the beam of source light, green light coming from the light source is reduced approximately by a half. For convenience, the color printer system of the invention is described herein principally with respect to a colorhead of the subtractive type. However, it is to be understood that the invention is equally adaptable to a colorhead of the additive type.

COLOR PRINTER SYSTEM

Figure 1:
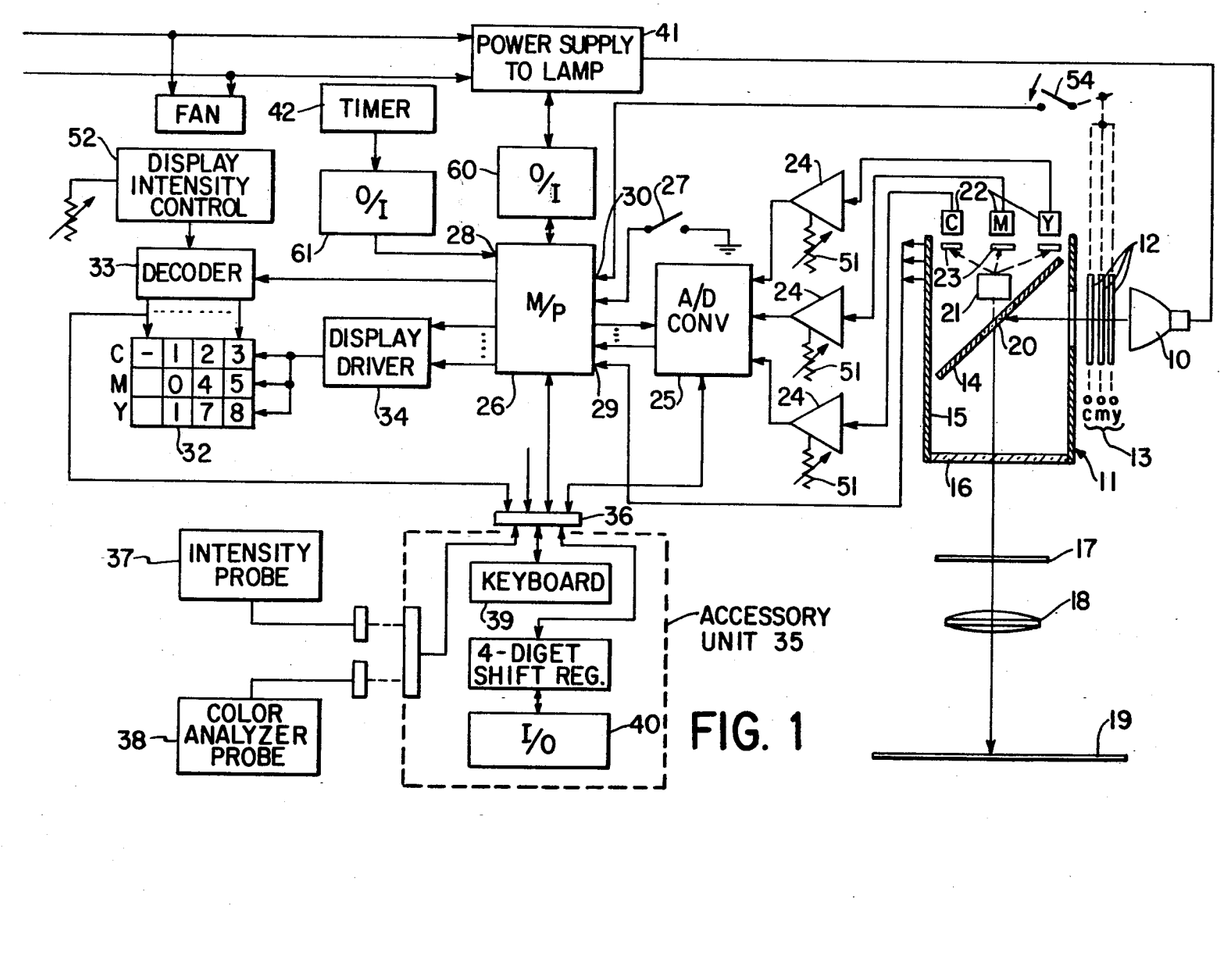
FIG. 1 illustrates schematically an exemplary digital color printer system according to the invention utilizing a subtractive-type colorhead.
Figure 3:
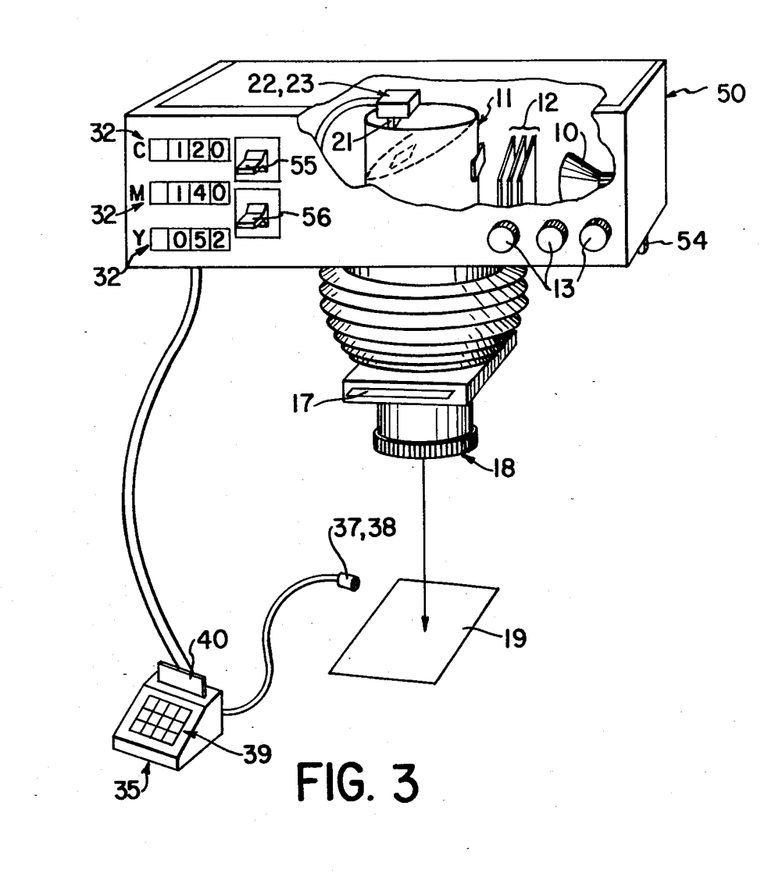
FIG. 3 shows schematically a perspective view, partly in section, of the integrated color printer system of FIG. 1.

Referring to FIGS. 1 and 3, an integrated, digital color printer system according to the invention employs, for purposes of illustration, a subtractive-type colorhead having a lamp 10 serving as the source of a beam of white light aimed at an aperture in a mixing chamber 11. Across the beam of white light, three filters 12 are positioned variably by filter drive controls 13 in order to reduce the intensity of an associated primary color by an amount corresponding to position. In FIG. 1, the drive controls 13 are designated C, M, and Y for the primary colors, cyan, magenta, and yellow.

The mixing chamber 11 has a reflective surface 14 and reflective side walls 15 for mixing the incident light for a uniform color mixture output. The light is directed through a diffuser or a condenser system indicated at 16 onto an original photographic negative (or positive, depending upon the exposure mode) film 17, and the light projected through the film is focused through an enlarging lens 18 onto a developable photographic print material or sheet 19.

The primary color intensities of the incident light in the mixing chamber are directly measured by photosensors 22 sampling the light through a small aperture or transmissive mirror 20 in the reflective surface 14. A mixer equalizer 21 may be provided to adjust the amount of light to the photosensors 22 in order to compensate for differences in the reflective properties of various mixing chambers that are used. Photosensors 22, correspondingly designated C, M, Y, provide voltage signal outputs corresponding to the intensity levels of the primary colors sensed. The photosensor output signals are amplified by respective amplifier stages 24 and converted to digital signals by an analog-to-digital converter 25. The digital color value signals are then supplied to a system microprocessor 26 which processes the data in accordance with the various program functions of the system stored in its memory.

A mode switch 27 for selecting either a "density" or "filtration" mode of the colorhead provides an input to the microprocessor 26. Other inputs include a timer signal 28, a mixing chamber identifier signal 29, and a status signal 30 for a white light test position for the filters 12. When the white light lever 54 is in the test mode, the filters 12 are collectively moved out of the path of the light source 10. The microprocessor 26 in this embodiment of the invention drives a digital display 32 through a decoder 33 and a driver unit 34.

For a preferred embodiment of the invention as illustrated in FIG. 1, a combined accessory unit 35 interfaces with the microprocessor 26, the analog-to-digital converter 25, and the decoder 33 through a connector 36. The accessory unit 35 includes in combination an intensity probe 37 and/or a color analyzer probe 38, a keyboard 39 for providing data or program commands to the system, and a an input/output device 40 for reading from or recording data onto a storage medium.

Each component part and the functions performed by the color printer system of this invention will now be described in further detail.

COLORHEAD

Figure 2:
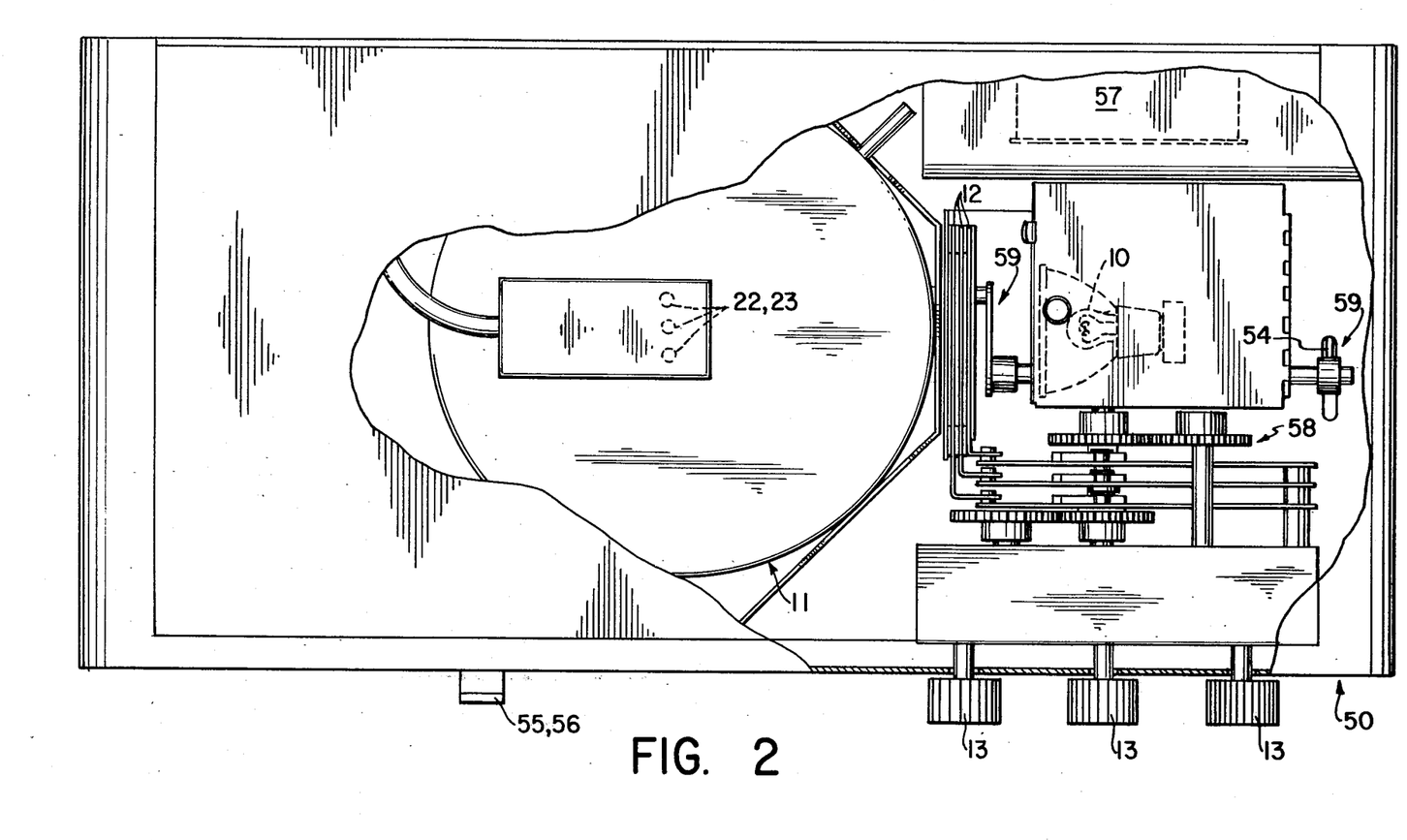
FIG. 2 is an overhead diagrammatic view, partly in section, of a subtractive colorhead unit consistent with the inventive color printer system of FIG. 1.

As illustrated schematically in FIG. 1 and in an overhead diagrammatic view of the colorhead unit 50 in FIG. 2, a lamp 10, typically a halogen type, is mounted in a reflector. Voltage to the lamp is provided by a power supply 41 which is preferably stabilized against voltage variations. The power supply to the lamp is, in an operating mode, turned on by response of the system to an external timer 42 which controls the length of time of exposure, or from an internal timer controlled from the keyboard 39 in the accessory unit 35. The signal from the timer may be isolated from the microprocessor by an opto-isolator (O/I) 60.

The internal arrangement of the colorhead unit may be seen in FIG. 2. The electronics circuitry is contained on printed circuit boards (not shown) located on the left-hand side of the chassis. On the right-hand side of the chassis are located the light source assembly 10 and a blower assembly 57 used to provide cooling. The three filters 12 are placed in front of the lamp 10. Each one is controlled by an individual position control knob 13 geared to the position drive assembly 58 for the filters. The light from the lamp passes through the resulting position of the filters and enters a mixing chamber 11 where it is mixed to provide a uniform color light. The output of the mixing chamber is then directed through a diffuser or condenser system, projected through a negative film 17, and focused by an enlarging lens 18 onto a photographic paper or sheet 19.

The color density values of the incident light are detected by three photosensor devices 22 through corresponding color filters 23, indicated in FIG. 1 with the letter "C" for cyan, "M" for magenta and "Y" for yellow. The photosensor device could typically include sampling by a fiber optic rod. The color filters could be dichroic or absorption types, and infrared filters may be used along with the color filters. The light sensors 22 may typically be gallium arsenide phosphide or silicon photo diodes, preferably blue enhanced, silicon photo transistors, or photomultiplier tubes.

The output of each of the light sensors 22 is fed to a respective amplifier stage 24. Each of these amplifiers 24 has a zero-set calibration control 51. By means of the zero-set control 51, the digital color values displayed by the colorhead unit 50 can be calibrated at zero for any reference color mixture in a standardized light source. The standardized light source is placed in the position that the mixing chamber 11 occupies in FIG. 3, and the gains of the amplifiers 24 are adjusted by the controls 51 so that the color density values, designated $M_d$, $Y_d$, $C_d$, shown on the digital display 32, all read zero. When the system has thus been calibrated, the original mixing chamber 11 is replaced in the colorhead. It is desirable that the reference light source be one whose color, temperature, and light output approximates the color, temperature, and light output of the mixing chamber with the colorhead lamp in place.

The output voltages from the sensors 22 are linear with respect to the intensities of color light falling on the sensors. In the preferred embodiment shown in FIG. 1, the sensors outputs are converted to digital signals by the analog-to-digital (A/D) converter 25. The signals are then fed to the microprocessor (M/P) 26 where the corresponding digital color density values based upon 100 times the common logarithm of the intensity signals are computed. Alternatively, the amplifiers 24 may be logarithmic amplifiers for providing an analog signal equal to 100 times the common log of the light intensity, which is then converted to a digital signal by the A/D converter 25. The color density values derived are held in sample and hold circuits. When the exposure lamp is turned off, the sample and hold circuits sense this through an output from the lamp power supply 41 isolated from the microprocessor or electronic circuitry by an opto-isolator (O/I) 61. The last values held in the sample and hold circuits provide a reading of the color density values of the incident light. Some microprocessor units include sample and hold circuits and an A/D converter.

In accordance with one function (the density mode) of the system, the converted digital color density values are stored in the system microprocessor 26 and displayed on the numerical display 32 for each primary color, here cyan, magenta, and yellow. The visual displays may be light emitting diodes (LED's), liquid crystal diodes (LCD's), nixie tubes, or other forms of digital displays. The circuitry from the A/D converter through the displays preferably operates with a time shared input, sharing three voltages in sequence, and a time shared output, sharing three displays in sequence.

The general physical arrangement of a preferred embodiment of the colorhead unit 50 may be seen in FIGS. 2 and 3. On the left-hand side of the front panel shown in FIG. 3 are three LED digital displays, designated C, M, Y, for cyan, magenta, and yellow. Each display consists of segments forming three digits. Since the measured color light intensities may produce either plus or minus variations about the reference zero, a plus or minus sign position is also provided in the display. The brightness of the LED displays is controlled by a display intensity control 52. Next to the displays is an On/Status/Off switch 55 and below that a Mode switch 56. The function of the Mode switch is to select either the density or filtration mode for the colorhead. On the lower right-hand side of the front panel, the control knobs 13 are used to control the movements of the respective filters in the colorhead.

Referring to FIG. 2, a white light lever 54 and crank assembly 59 may be moved to a test position to permit the filters 12 to be withdrawn completely from the light path so that focusing and composing of the projected image may be easily accomplished. Returning the white light lever 54 to its color position permits the filters to be restored to the values they previously had. The status of the white light lever is applied to the microprocessor. When the lever is in the white light test position, the microprocessor presents a message on the display which indicates to the operator that the color filters are out. If the enlarging lamp is turned off with the white light lever in the test position, for example, when the operator desires to place photographic paper under the enlarger, the lamp cannot be turned on again while the lever remains in the test position. This device prevents inadvertent exposure. When the microprocessor detects this attempt at improper exposure, it prevents the lamp from being turned on and flashes a message on the LED displays to alert the operator to the problem.

The colorhead unit is arranged to accept several interchangeable mixing chambers. For example, different mixing chambers for 4"×5" negatives, for 6 cm×7 cm negatives, or for 35 mm negatives and smaller may be used, as well as a mixing chamber when the enlarger is used with a condensing system. These mixing chambers are each equipped with a mixer equalizer 21 (FIG. 1). The purpose of the equalizer is to adjust the light arriving at the sensors 22 from each of the mixing chambers to the same value. The mixing equalizer may consist of a fixed, neutral density filter and a variable attenuator interposed in the light path. The photosensor filters 23 are selected for each chamber so that nominally the light received by the sensors 22 is the same for all mixing chambers.

A Status position may be provided on the On/Off switch. In the Status mode, the microprocessor is arranged to display the figure "8" on all of the LED displays for a period of approximately two seconds, and then display the code of the mixing chamber installed in the colorhead. The microprocessor determines this by a three bit binary input 29 from a connector on the mixing chamber. Connector pins may be arranged to provide either one or zero inputs to the microprocessor in accordance with a predetermined code.

Figure 6:
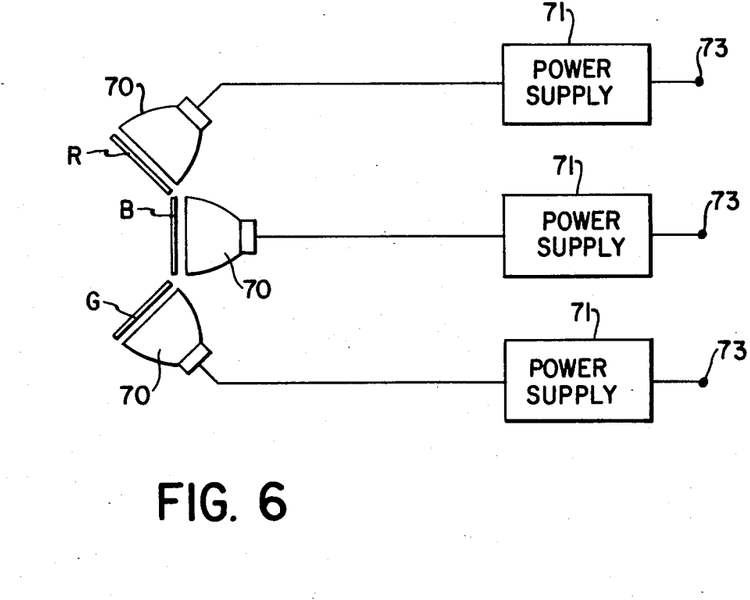
FIG. 6 is a schematic diagram of an additive colorhead for use in the invention.

The present invention can also be adapted to an additive-type color printer system. In FIG. 6, one form of an additive colorhead is shown schematically having lamps 70 which are powered by separate power supplies 71 in accordance with controls 73. The lamps have filters R, B, G for the corresponding primary colors red, blue, and green, which are added together to form the incident light to the mixing chamber 11. The remainder of such an additive color printer system can be substantially similar to that described for the subtractive system herein, it being understood that the power controls 73 are operated in an analogous manner as controls 13 for positioning the filters 22 of the subtrative colorhead embodiment.

MICROPROCESSOR

Figure 4:
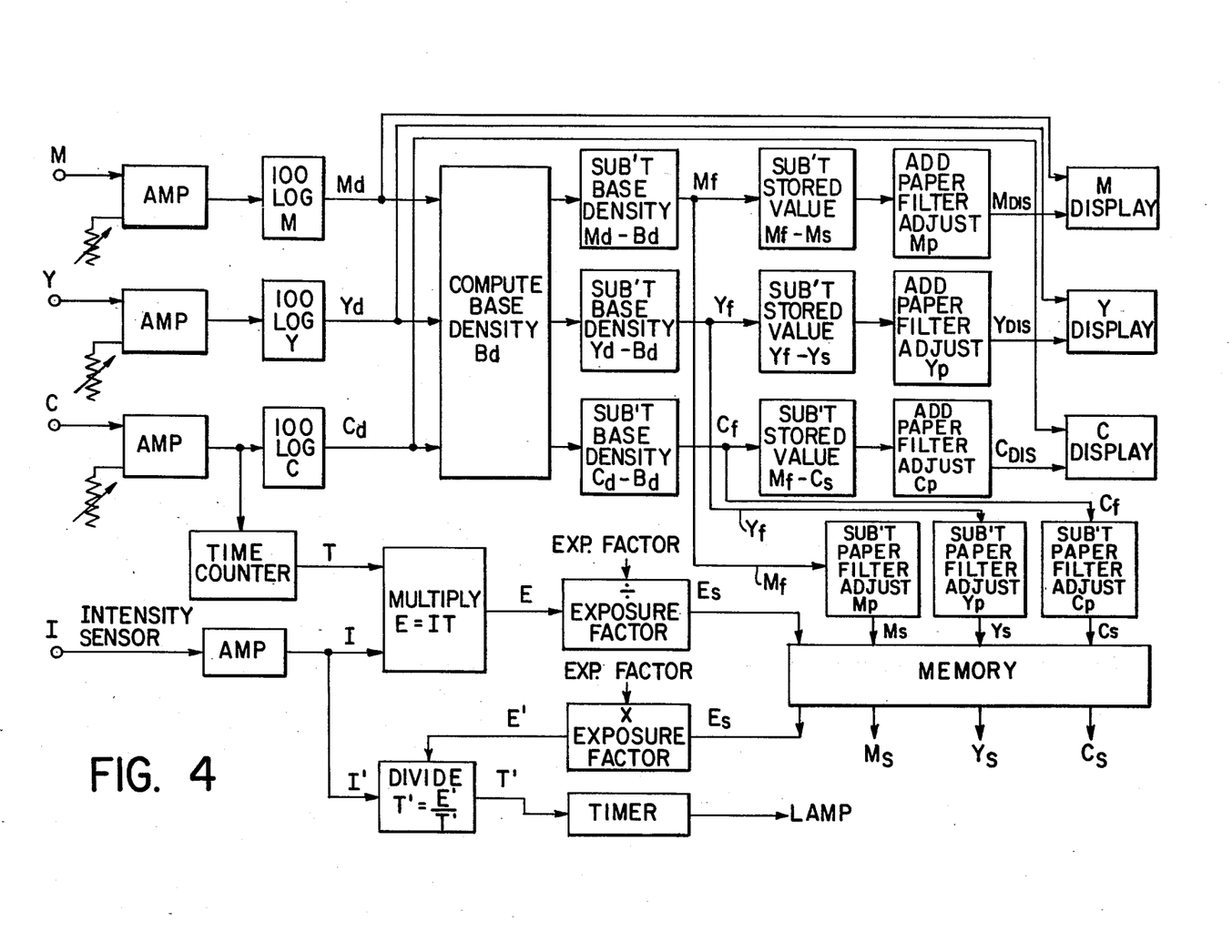
FIG. 4 is a block diagram of the main programmed functions of a digital colorhead system according to the invention.

The main functions of the microprocessor in deriving and using the digital color values for programming the filter adjustments of the colorhead are illustrated in the block diagram of FIG. 4. In the "density" mode, the microprocessor for the digital colorhead system stores the digital data corresponding to the measured light intensity of each of the primary colors of the incident light and displays the data numerically on the LED display.

Referring to FIG. 4, the voltage output of the sensors, M, Y, C, after passing through suitable amplification is converted to a digital signal and calculated in the microprocessor as color density values $M_d$, $Y_d$, $C_d$, equal to the common logarithm of light intensity multiplied by 100. The voltage for a reference intensity level calibrated against the standardized light source is calculated as a numerical zero. In the convention of the preferred embodiment of the invention, the color density value corresponding to an intensity higher than a reference intensity is accompanied by a negative sign, and an intensity lower than the reference intensity has a positive sign. Suitable microprocessor unit commercially available are the Fairchild 3870, the Intel 8080, the Motorola 6800, or a similar system. In an alternate embodiment, the density values $M_d$, $Y_d$, $C_d$ may be derived through multiplier and log amplifier stages.

For many applications of the colorhead, it is useful to have the color value displays provide information about the relative color mixture of the light only, not influenced by light intensity variations. For this purpose, the system of the invention in a "filtration" mode determines the neutral or base density $B_d$ of the light and calculates the relative differences from the base density for each color in terms of filtration values $M_f$, $Y_f$, $C_f$. The base density corresponds to the lowest of the density values (highest intensity), and, as shown in FIG. 4, the filtration values are computed by subtracting the base density from each color density value. As an illustration, examples of the computation of density and filtration values are shown below:

Example A (reference light, no filtration)

|  | Magenta | Yellow | Cyan |
|---|---|---|---|
| Sensor voltage | 1.0 volt | 1.0 volt | 1.0 volt |
| Density value | 0 | 0 | 0 |
| Filtration value | 0 | 0 | 0 |

Example B (source light at half reference intensity, no filtration)

|  | Magenta | Yellow | Cyan |
|---|---|---|---|
| Sensor voltage | 0.5 volt | 0.5 volt | 0.5 volt |
| Density value | 30 | 30 | 30 |
| Filtration value | 0 | 0 | 0 |

Example C (intensity as in Example A, filtration of magenta and yellow)

|  | Magenta | Yellow | Cyan |
| --- | --- | --- | --- |
| Sensor voltage | 0.1 volt | 0.5 volt | 1.0 volt |
| Density value | 100 | 30 | 0 |
| Filtration value | 100 | 30 | 0 |

Example D (intensity half that of Example C, same filtration)

|  | Magenta | Yellow | Cyan |
| --- | --- | --- | --- |
| Sensor voltage | 0.05 volt | 0.25 volt | 0.5 volt |
| Density value | 130 | 60 | 30 |
| Filtration value | 100 | 30 | 0 |

Example E (intensity twice that of Example C, same filtration)

|  | Magenta | Yellow | Cyan |
| --- | --- | --- | --- |
| Sensor voltage | 0.2 volt | 1.0 volt | 2.0 volt |
| Density value | 70 | 0 | −30 |
| Filtration value | 100 | 30 | 0 |

In Example A above, the subtractive colorhead system is calibrated at the zero level for a reference source of white light without filtration. In Example B, the source light at half the reference intensity results in equal density values of 30. Since the lowest density value is 30, this is subtracted from all density values to obtain filtration values of zero. A selective filtration of magenta and yellow in Example C of source light at the reference intensity results in $M_d=100$, $Y_d=30$, and $C_d=0$; since the base density is the zero figure for cyan, the corresponding filtration values are $M_f=100$, $Y_f=30$, and $C_f=0$. Example D shows the same filtration, but half the source intensity of Example C resulting in an increase by 30 of all density values but the same filtration values as in Example C. Finally, Example E shows the same filtration at twice the intensity of Example C producing a decrease by 30 of all density values, but the same filtration values as in Example C. Thus, the color printer system of the present invention, adapted to a subtractive color head, provides, in the "density" mode, a digital display of quantized color density values representing (by an opposite sign convention) 100 times the common log of the measured intensity over a reference intensity level of each primary color of the incident light in the mixing chamber. In the "filtration" mode, the system displays computed filtration values representing the relative difference of each color over a base or neutral density value.

The derivation of the filtration values has great utility. They are a quantification of the make-up of the color mixture selected without regard to the intensity of the source lamp, and can be used to reprogram the exact color mixture in the same or a similar color printer. As an example, if the values of $M_f$, $Y_f$, and $C_f$ have been established for a given negative and paper combination and during the course of the printing session the enlarging lamp burns out and has to be replaced, the light output of the new lamp may be different from that of the old lamp. If the filtration positioning of the filters is made such that the values of $M_f$, $Y_f$, and $C_f$ are made equal to the values previously established, then the color of the light being applied to the negative is the same, and therefore, the prints will be the same. As a second example, it may be seen that if these values are established for a good print in one color printer system, the same values will produce the same results in another such color printer system if both systems have been calibrated against the same reference light.

In order to be able to reprogram the color printer for the subsequent reproduction of the same print, the filtration values may be stored in a memory device or medium which is associated or referenced to the negative that was printed. The memory device may be a semiconductor memory device, such as a RAM or EAROM (which has the advantage of being non-volatile), or an external memory device such as punched paper tape or magnetic tape. For example, the data can be recorded by a read/write head of an input/output device 40, such as a card reader, on a small length of ⅛ inch audio magnetic tape applied to the card which can be stored with the negative. The information can then subsequently be retrieved from the card upon inserting the card in the card reader.

As is well-known to those skilled in photography, printing paper characteristics vary from emulsion to emulsion. Photographic paper manufacturers such as Kodak therefore publish paper filter and exposure values for each box of paper. In the preferred embodiment of the invention, the stored values for a good print from a particular negative include an adjustment for the paper filter values of the paper used in making the good print. Referring to FIG. 4, the paper filter adjustment is obtained by subtracting the paper filter values $M_p$, $Y_p$, $C_p$ from the color filtration values $M_f$, $Y_f$, $C_f$. The adjusted values $M_s$, $Y_s$, $C_s$ are then stored in memory.

The user of this system thus has the ability to recall the digital color values stored in memory for a given negative and to use those values to reproduce an exact print of that negative again. In the operation of the inventive color printer system during reprinting, as shown in FIG. 4, the values of $M_s$, $Y_s$, $C_s$ are recalled from memory and subtracted from the current filtration values $M_f$, $Y_f$, $C_f$. The current paper filter adjustment values $M_p$, $Y_p$, $C_p$ are added to arrive at the current color values $M_{Dis}$, $Y_{Dis}$, and $C_{Dis}$ for display. To establish the correct positioning of the filters 12 in the colorhead (FIG. 3) corresponding to the stored values, the operator simply adjusts the position controls 13 for the filters until the displays read down to zero. When this is done the colorhead has been reprogrammed to reproduce the same color information at the print as was done previously.

In order to complete the parameters for a successful print, the exposure time of the lamp and the total light intensity at the print must be determined. The intensity of the light from the colorhead is normally controlled by adjusting the F value of the enlarging lens 18. Referring to FIGS. 3 and 4, a time counter connected to one of the photosensor outputs is used to measure the exposure time used to make a good print. After the exposure has been made, the digital value for the time T is stored in a temporary memory in the microprocessor. Additionally, a light sensor in an intensity probe 37 placed at the baseboard (i.e. at the print) measures the total light intensity I during exposure which is also converted to a digital value. The microprocessor computes the product of $I \times T$ which is equivalent to the total exposure value E. This value is then corrected by dividing by the paper exposure factor to yield a corrected value of $E_s$ for the print. The paper exposure factor is published for the particular paper being used and is keyed on the keyboard 39 into the system by the operator. This value of $E_s$ can be stored on the card by the card reader 40 along with the values of $M_s$, $Y_s$, $C_s$ for the negative from which the good print was made.

When a subsequent reproduction from that negative is desired, the positioning adjustments for the filters 12 are made, as described above. The intensity probe is placed on the baseboard, and the system is switched into a mode in which the stored $E_s$ value is recalled from memory, i.e. read from the magnetic tape on the card by the card reader 40. It is then multiplied by the published paper exposure factor for the paper now being used to give a new value of E'. The new exposure time is now calculated by dividing this value of E' by the intensity I' measured by the probe 37 on the baseboard yielding a value of T' which is displayed on one of the digital displays. If the operator is satisfied that the computed exposure time is a satisfactory number, he can run his print. If he is not satisfied with it, he can vary the F stop on the enlarging lens 18 until he obtains the time that he would like to print for.

Another useful feature of the invention is its ability to quantify and compensate for "cross-talk" between the color content of each primary color component of the incident light. In conventional color printer systems, the introduction of one primary color, such as by adding color light from a variable lamp source or subtracting it with a dichroic or absorption filter, inevitably includes trace amounts of the other primary colors. Since the present invention provides for the direct measurement of color intensities of the incident light in the mixing chamber and for the quantification of such intensities into digital color values displayed on the colorhead panel, the operator is given a visual indication of the cross-talk with the other primary colors generated by his adjustment of one primary color, i.e. by adjusting the position of one filter 12 with the associated control 13 (FIG. 3) or the power to one lamp 70 by the control 73 (FIG. 6). The operator can thus compensate for the cross-talk effects and adjust the colorhead to the exact color values desired.

All of the above-described functions are accomplished by calling for the appropriate system program stored in the microprocessor 26. Such programs may be implemented in a suitable microprocessor unit as is well understood by persons knowledgeable in that field. The functions that create the various digital color values and time and exposure values, as well as the information necessary to drive the displays, are stored and utilized by the microprocessor. The microprocessor is also used in conjunction with the timer to control the exposure lamp. The keyboard 39 interfaces with the microprocessor in order to provide system data and to control the microprocessor and system operation. The output from the microprocessor for the displays are arranged in binary coded decimal form suitable for driving the display drivers 34. The display switching is similarly under the control of the microprocessor.

The line voltage input (FIG. 1) to the lamp power supply 41 may be applied to a voltage regulator and then through a solid state switching device to the enlarging lamp 10. The solid state switching device, for example, a Triac, is controlled by either the timing function of the microprocessor or by the microprocessor's response to a signal from an external timer 42 to turn the lamp on and off. A signal from the output of the switch may then be applied to the microprocessor so that it will register when the lamp is being shut off. The signal will permit the input values of M, Y, C to be retained so that the displays will continue to read the appropriate density or filtration values even though the lamp is not on.

It is also advantageous to provide a white light lever 54 (FIG. 3) on the colorhead for moving the filters out of the light path. The white light test mode is used for focusing and composing the image prior to printing. Since it is common for the operator to forget that such a white light condition may be on, the microprocessor can be programmed to sense when the white light lever is in the test mode and to prevent the power switch to the lamp from coming on until the condition is reversed. Additionally, a separate white light test mode display on the colorhead panel can indicate to the operator that the print is not being made because the white light lever is in the wrong position.

ACCESSORY UNIT

As described above with respect to FIGS. 1 and 3, a total digital color printer system according to the invention includes an acessory unit 35 which preferably combines together the input/output device, such as a card reader 40 for magnetic tape storage, the keyboard 39, a shift register 62, the timer control, and either an intensity probe 37 or a color analyzer probe 38. The keyboard permits access to the programs stored in the microprocessor so that all of the functions and novel features of the system may be performed.

When it is desired to store data for a particular print on a magnetic card, information from the microprocessor is transferred in serial order into the shift register 62. When the data is all in the shift register, the card is run through the magnetic I/O device 40. Two parallel secondary tracks may be provided on the magnetic tape. One track contains a clock signal; the other contains the data. When storing data onto the card, the magnetic head reads the clock signal track and uses this as a clock signal to transfer the data from the shift register onto the magnetic card. When it is desired to read data from the card, the card is read by the magnetic head and the data is transferred into shift register. The data is then serially transferred into the microprocessor.

The exposure intensity probe 37 may consist of a single photodiode sensor, either a blue silicon cell or a galium arsenide phosphide cell and an amplifier. The probe is arranged to look at the light falling on the baseboard. The system may be calibrated to convert and display the intensity of the light incident on the baseboard in foot candle units. As discussed previously, a color analyzer probe 38 may be used instead of the exposure intensity probe 37. The color analyzer probe is used to measure the color values M, Y, C of the primary colors in a particular area of the projected image from the negative, and, in conjunction with the digital colorhead and programmed microprocessor system, described above, can be used to derive time and exposure values and produce a print having the desired color values for the analyzed area. The color analyzer sensors may be photo diodes, photo transistors, or photo multiplier tubes. The output from the sensors is amplified, converted, and applied to the digital display in a similar operation as described previously with respect to the colorhead. The color analyzer probe 38 is also used to derive the intensity value, I, which is computed by adding together a weighted sum of the three measured color values of M, Y, and C in accordance with the sensitivity requirements of the photographic paper. The exposure, intensity, and time value computation, utilization, and storage are carried out as described previously. Several analyzer programs can be stored in memory and assigned identification numbers which can be entered and called up on the keyboard 39.

Figure 5:
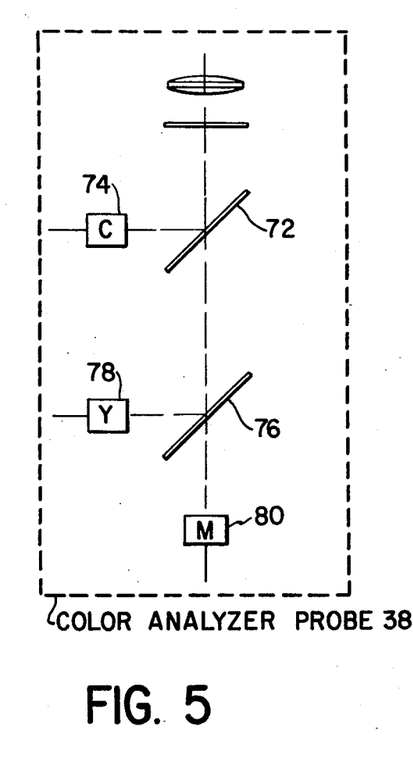
FIG. 5 is a schematic diagram of a preferred color analyzer probe for the color printer system of the invention.

FIG. 5, a preferred color analyzer probe 38 is shown schematically. Projected light falling on the probe is split by a first dichroic filter 72 so that red light goes to the cyan sensor 74 and blue and green light continue on through. At the second dichroic 76, blue light is reflect to the yellow sensor 78 and the green light continues on through to the magenta sensor 80. This arrangement permits the incoming light to be divided amongst the three sensors 74, 78, 80 and using only two dichroic filters.

Less expensive versions of this arrangement may be used. For example, a single light sensor may be used with filters switchable in front of the sensor to produce the magenta, yellow and cyan information in sequence. This information can be stored, the calculations accomplished by the microprocessor, and the color values displayed of the print area being analyzed. Again, the sensors may be photo diodes or photomultiplier tubes.

The color analyzer may be used to program the positions of the filters 12 in the colorhead by a procedure similar to that described above. After a successful print has been made, the color analyzer probe is placed in the portion of the projected image that is desired to be analyzed. Values for $M_s$, $Y_s$, $C_s$, and $E_s$ (the exposure time was already stored after the last print was made) are then computed and stored as described previously. When it is desired to make a subsequent print by analyzing the negative, the particular analyzer program number to be used is entered on the keyboard. The operator then adjusts the positions of the filters 12 in the corlorhead so that the displays of $M_{Dis}$, $Y_{Dis}$, $C_{Dis}$ are all zeros. After this is accomplished, the analyzer is switched to the timer mode with one of the digital displays displaying the calculated printing time. If the operator wants to modify the exposure time, he can vary the F stop on the enlarging lens until the printing time is satisfactory. The new printing time is stored and, upon activating the timer, the timer turns the lamp on for the selected period of time and resets itself when the lamp goes off.

The versatility of the microprocessor can be used to handle other photographic attributes which may be important in a darkroom system. For example, the user may want to store information on the temperature and pH values used to develop a good print. A temperature sensor, pH sensor, or other sensors may be coupled to the microprocessor and associated circuitry for conversion to digital values, display, and/or storage in memory associated with a particular negative. These probes may be provided as accessory items with the other probes of the accessory unit 35 or may be combined in a single probe.

The above-described preferred embodiment is exemplary of the present invention. Many variations and modifications of the inventive concepts disclosed herein will be apparent to those skilled in the art. For example, as discussed previously, the present invention is equally adaptable to photographic color printer systems of the additive type, or may be used in conjunction with automatic printing systems or with such other refinements as may be advantageous to a darkroom user. It is to be expressly understood that all such modifications and variations are included within the scope of the invention, as defined in the following claims.

What is claimed is:

1. An integrated, digital photographic color printer system comprising:
a light source,
variable means for controlling a color mixture of light from the source variably with respect to a set of primary colors,
means for directing the variably controlled light as incident light through a photographic film for projecting an image onto a developable photographic medium,
means including photosensors associated with the light directing means for providing signals indicative of the light intensity of the primary colors in the incident light prior to the passage of the light through the photographic film,
means for converting the primary color intensity signals into digital color values,
a probe interfaced with said microprocessor for measuring the intensity of light projected through the photographic film,
means including a microprocessor for storing system data and programs for system functions and for performing programmed functions of the system, including means for measuring the time of exposure for a print, means for deriving color value data from digital color values corresponding to the primary color intensity signals, and means for deriving exposure data from said light intensity and time measurements,
and means for displaying numerically the derived color value and exposure data.

2. The integrated, digital photographic color printer system of claim 1 wherein said microprocessor includes means for setting the color mixture of incident light and exposure time for a print from color value and exposure data.

3. The integrated, digital photographic color printer system of claim 1 further comprising a magnetic input/output device interface with said microprocessor for reading in system data from or writing system data onto a magnetic storage medium.

4. The integrated, digital photographic color printer system of claim 3 wherein said magnetic storage medium is a magnetic tape for storing color value or exposure data associated with a photographic film or print.

5. The integrated, digital photographic color printer system of claim 1 wherein said color mixture controlling means is of the subtractive type having a set of filters corresponding to the primary colors and means for interposing the filters variably in the path of light from said light source.

6. The integrated, digital photographic color printer system of claim 1 wherein said light directing means includes a mixing chamber for light from said source.

7. The integrated, digital photographic color printer system of claim 6 wherein said light directing means has means for accommodating interchangeable mixing chambers.

8. The integrated, digital photographic color printer system of claim 7 wherein the interchangeable mixing chamber includes an adjustment device for adjusting the level of light received by the photosensors.

9. The integrated, digital photographic color printer system of claim 1 further comprising means for calibrating the color value response of the system with reference to a standard light source.

10. The integrated, digital photographic color printer system of claim 1 further comprising means including a keyboard interfaced with said microprocessor for inputting data and selecting programmed functions of the system.

11. The integrated, digital photographic color printer system of claim 10 further comprising an input/output device interfaced with said microprocessor for reading in system data or writing system data onto a storage medium, wherein the keyboard, input/output device, and probe are combined into a single accessory unit.

12. An integrated, digital photographic color printer system comprising a light source, variable means for controlling a color mixture of light from the source variably with respect to a set of primary colors, means for directing the variably controlled light as incident light through a photographic film for projecting an image onto a developable photographic medium, said light directing means including a mixing chamber for light from said source, means including photosensors associated with the light directing means for providing signals indicative of the light intensity of the primary colors in the incident light prior to the passage of the light through the photographic film, means for converting the primary color intensity signals into digital color values, a probe interfaced with said microprocessor for measuring the intensity of light projected through the photographic film, means including a microprocessor for storing system data and programs for system functions and for performing programmed functions of the system, including means for measuring the time of exposure for a print, means for deriving color value data from digital color values corresponding to the primary color intensity signals, and means for deriving exposure data from said light intensity and time measurements, means for displaying numerically the derived color value and exposure, and means for identifying a particular mixing chamber and displaying a code number for the mixing chamber.

13. An integrated, digital photographic color printer system comprising a light source, variable means for controlling a color mixture of light from the source variably with respect to a set of primary colors, said mixtures controlling means being of the subtractive type having a set of filters corresponding to the primary colors and means for interposing the filters variably in the path of light from said light source, means for directing the variably controlled light as incident light through a photographic film for projecting an image onto a developable photographic medium, means including photosensors associated with the light directing means for providing signals indicative of the light intensity of the primary colors in the incident light prior to the passage of the light through the photographic film, means for converting the primary color intensity signals into digital color values, a probe interfaced with said microprocessor for measuring the intensity of light projected through the photographic film, means including a microprocessor for storing system data and programs for system functions and for performing programmed functions of the system, including means for measuring the time of exposure for a print, means for deriving color value data from digital color values corresponding to the primary color intensity signals, and means for deriving exposure data from said light intensity and time measurements, means for displaying numerically the derived color value and exposure data, means for displacing the set of filters from the path of light from said light source during a test mode of the system, and fail-safe means for preventing exposure of a print while the filters are in a displaced position and for indicating to an operator that the filters are in a displaced position.

* * * * *